US012075840B2

(12) United States Patent
Rath et al.

(10) Patent No.: US 12,075,840 B2
(45) Date of Patent: Sep. 3, 2024

(54) METHOD AND APPARATUS FOR CONTROLLING THE TEMPERATURE OF AN EVAPORATOR FOR AN INHALER, IN PARTICULAR AN ELECTRONIC CIGARETTE PRODUCT

(71) Applicant: KÖRBER TECHNOLOGIES GMBH, Hamburg (DE)

(72) Inventors: Sonali Rath, Heilsbronn (DE); Muhannad Ghanam, Freiburg (DE); Jan Jaklin, Fellbach (DE); Uwe Pelz, Schallstadt (DE); Peter Woias, Freiburg (DE); Frank Goldschmidtboeing, Ortenberg (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 624 days.

(21) Appl. No.: 17/297,832

(22) PCT Filed: Nov. 25, 2019

(86) PCT No.: PCT/EP2019/082469
§ 371 (c)(1),
(2) Date: May 27, 2021

(87) PCT Pub. No.: WO2020/109253
PCT Pub. Date: Jun. 4, 2020

(65) Prior Publication Data
US 2022/0030954 A1    Feb. 3, 2022

(30) Foreign Application Priority Data

Nov. 28, 2018   (DE) .................... 102018130105.7

(51) Int. Cl.
*A24F 40/57*   (2020.01)
*A24F 40/10*   (2020.01)
(Continued)

(52) U.S. Cl.
CPC .............. *A24F 40/57* (2020.01); *A24F 40/10* (2020.01); *A24F 40/53* (2020.01); *G05D 23/2401* (2013.01)

(58) Field of Classification Search
CPC .......... A24F 40/57; A24F 40/53; A24F 40/10; G05D 23/2401
(Continued)

(56) References Cited

U.S. PATENT DOCUMENTS 8,863,752 B2 * 10/2014 Hon .................... H01M 10/488
131/194
10,058,128 B2 *  8/2018 Cameron ................ H02J 7/34
(Continued)

FOREIGN PATENT DOCUMENTS

CN         104981298 A     10/2015
DE   20 2014 101 126 U1    6/2014
(Continued)

OTHER PUBLICATIONS

First Examination Report issued by the German Patent and Trademark Office on Oct. 19, 2018 with respect to the German priority application No. 10 2018 130 105.7.
(Continued)

*Primary Examiner* — Peter G Leigh
(74) *Attorney, Agent, or Firm* — SALIWANCHIK, LLOYD & EISENSCHENK

(57) ABSTRACT

A method for controlling the temperature of a vaporizer for an inhaler, in particular an electronic cigarette product, comprising the steps of measuring the voltage applied to a heating element; measuring the current flowing through the heating element; determining the resistance of the heating element from the measured voltage and the measured current; controlling the temperature of the heating element by switching off the switching element in a controlled manner
(Continued)

so that the current flow through the heating element is interrupted when the determined resistance exceeds or falls below a first critical threshold R_co.

14 Claims, 3 Drawing Sheets

(51) Int. Cl.
*A24F 40/53* (2020.01)
*G05D 23/24* (2006.01)
(58) Field of Classification Search
USPC .......................................................... 131/328
See application file for complete search history.

(56) References Cited

U.S. PATENT DOCUMENTS

| | | | |
|---|---|---|---|
| 2015/0314078 A1 | 11/2015 | Müller | |
| 2017/0135410 A1* | 5/2017 | Cameron | ................. H05B 3/12 |
| 2017/0182267 A1* | 6/2017 | Cameron | ............. A61M 11/042 |
| 2017/0196273 A1* | 7/2017 | Qiu | ........................ A24F 40/44 |
| 2017/0332702 A1* | 11/2017 | Cameron | ................ A24F 40/65 |
| 2018/0020728 A1* | 1/2018 | Alarcon | ............... H05B 1/0244 |
| | | | 392/404 |
| 2018/0042306 A1* | 2/2018 | Atkins | .................... A24F 40/50 |
| 2018/0296777 A1* | 10/2018 | Terry | .................. A61M 11/042 |
| 2019/0323900 A1 | 10/2019 | Woelfl | |

FOREIGN PATENT DOCUMENTS

| | | | | |
|---|---|---|---|---|
| EP | 2 495 004 A1 | 9/2012 | | |
| EP | 2495004 B1 * | 4/2014 | .......... | A61M 11/041 |
| GB | 2542011 A * | 3/2017 | .......... | A24F 47/008 |
| KR | 20170007267 A * | 1/2017 | ............ | A24F 40/42 |
| WO | WO 2016/200382 A1 | 12/2016 | | |
| WO | WO 2018/027189 A2 | 2/2018 | | |
| WO | WO 2018/184810 A1 | 10/2018 | | |

OTHER PUBLICATIONS

Widerstandsmessgerät. Wikipedia, Stand Sep. 10, 2017 [recherchiert am Aug. 7, 2019], im Internet: <URL: https://de.wikipedia.org/wiki/Widerstandsmessgerät>.

Office Action issued by the Chinese Patent Office dated Apr. 19, 2023 in parallel Chinese patent application No. 201880099930.3.

* cited by examiner

METHOD AND APPARATUS FOR CONTROLLING THE TEMPERATURE OF AN EVAPORATOR FOR AN INHALER, IN PARTICULAR AN ELECTRONIC CIGARETTE PRODUCT

CROSS REFERENCE TO RELATED APPLICATIONS

This application is a National Stage Application of International Application Number PCT/EP2019/082469, filed Nov. 25, 2019; which claims priority to German Application No. 10 2018 130 105.7, filed Nov. 28, 2018.

FIELD OF INVENTION

The present invention relates to a method and a device for temperature control of a vaporizer for an inhaler, in particular an electronic cigarette product, wherein the vaporizer comprises at least one electrical resistance heating element, and with an electronically controlled switching element, wherein the current flow through the heating element can be switched on and off with the switching element.

BACKGROUND OF THE INVENTION

Typical e-cigarettes on the market vaporize without temperature control. As a rule, the heating coils are supplied with a DC voltage or voltage pulses. The heating power is then adjusted depending on the respective temperature-dependent total resistance of the heating circuit. The heater temperature thus depends not only on the set heating voltage, but also on the heat dissipation. However, this heat dissipation depends on further uncontrolled influencing variables, such as the ambient temperature, the liquid temperature, the heater wetting and the air flow along the heating element, so that the temperature can vary greatly. In particular, the effect of dry-puffing, the local overheating of the wire due to a local lack of liquid, leads to the formation of pollutants and/or the burning out of the heater.

The task of the invention is to provide a temperature control for a vaporizer that allows accurate temperature control at low heater voltage, even with relatively low heater resistance, and detects local overheating early and counteracts it.

The invention solves this task with the features of the independent claims.

BRIEF SUMMARY OF THE INVENTION

The invention comprises the steps of measuring the voltage applied to the heating element, measuring the current flowing through the heating element, determining the resistance of the heating element from the measured voltage and current, and controlling the temperature of the heating element by controlled switching off of the switching element so that the current flow through the heating element is interrupted when the determined resistance reaches a first critical threshold, corresponding to a temperature of the heating element exceeding a critical temperature.

Accordingly, the invention foresees a temperature control of the heating element by determining the heating resistance. The heating current and the heating voltage are measured at the heating element and the heating resistance is calculated in an electronic control unit, in particular according to Ohm's law. When a critical resistance corresponding to a critical temperature is reached, the switching element is switched off, so that the current flow through the heating element is interrupted, whereby the temperature of the heating element drops again and the generation of pollutants is reliably avoided. The invention provides a simple yet reliable temperature control for the at least one heating element. According to the invention, no complex regulation of the heating voltage takes place. Rather, the heating voltage can remain substantially constant and the temperature control is achieved by simply switching the current flow through the heating element off or on.

In an advantageous embodiment, the current flow through the heating element is switched off for a predetermined period of time when the determined resistance reaches the first critical value. The predetermined time period is such that the heating element cools down to a temperature below a target temperature within this time period. Thereupon, the switching element is advantageously switched on again, so that current flows through the heating element again and it is heated again.

In another embodiment, the current flow through the heating element remains switched off until the determined resistance reaches a second critical threshold, so that the temperature of the heating element is below a critical temperature. As soon as the non-critical state is reached, the switching element is advantageously switched on again, so that current flows through the heating element again and the heating element is heated again. In this embodiment, the current flow through the heating element is advantageously switched on periodically for only a short measurement interval in order to be able to perform the resistance measurement. In this way, very little energy is consumed for the resistance measurement.

Preferably, after the predetermined time period has elapsed, or when the determined resistance again falls below or exceeds the second critical threshold R_cu, the switching element is switched on again so that current flows through the heating element again.

Especially in the case of a heating resistor made of a PTC material (positive temperature coefficient), the first critical threshold R_co is advantageously an upper threshold and the second critical threshold R_cu is a lower critical threshold, so that R_cu<R_co. While the value for the upper resistance threshold R_co is fixed by the decomposition temperature of the liquid or by the maximum re-feed rate of the heater, the lower threshold R_cu can be set freely in a wide range. Depending on the setting of the lower threshold R_cu, a lower or higher proportion of the draw or puff time is in the temperature range of effective vaporization. Accordingly, the lower threshold R_cu can be used advantageously to adjust the amount of vapor.

Alternatively, instead of switching off the switching element, the temperature can be regulated by controlling it to supply the heating element with pulse-width-modulated voltage supply. The switching element is then advantageously used for pulse-width modulation, so that the heating element cools down less quickly and can be kept stable at the target temperature with suitable control.

Preferably, the resistance R(t) of the at least one heating element is determined by the electronic control device in a time-resolved manner. From the time course R(t) of the resistance, further information can be obtained which can advantageously be used for controlling and/or regulating the vaporizer. Furthermore, the time derivative dR(t)/dt of the resistance R(t) of the at least one heating element is also advantageously determined by the electronic control device. For example, the heating rate dR(t)/dt can be advantageously used to determine whether the heating element is sufficiently or insufficiently wetted, especially at the start of an evaporation process. The cooling rate dR(t)/dt after switching off the heating element can also be used advantageously as a measurement of the wetting of the heating element with liquid. In general, the heating rate dR(t)/dt and/or the cooling rate dR(t)/dt at a certain point in time or in a certain period of time is advantageously used as a measurement of the wetting of the heating element with liquid.

If the heating rate dR(t)/dt is greater than a predetermined value, the presence of a large vapor bubble covering significant portions of the heater area can be advantageously deduced. In this case, one or more suitable measures are taken, in particular reduction of the heater power, adjustment of the heater parameters, shutdown of the affected heater and/or output of an error message.

In an advantageous embodiment, when a time-constant resistance is detected, the resistance $R(T_{evaporation})$ corresponding to the evaporation temperature is determined, which provides additional useful information. For example, a change in the resistance $R(T_{evaporation})$ corresponding to an increase in the evaporation temperature can advantageously be used to determine an increase in higher boiling components in the liquid. In response, evaporation parameters such as the critical resistance values R_Co and/or R_cu can preferably be adjusted. Furthermore, if a preset value for the evaporation temperature is exceeded, the liquid reservoir can be evaluated as empty and further evaporation can be inhibited.

To increase the measuring accuracy, the heating element, the switching element, the voltage measuring device and the current measuring device are preferably fixed on the same board or on the same substrate. In this way, all contact resistances outside the device, as well as the heating voltage, cannot influence the temperature measurement. All contact and line resistances inside the device are low and constant due to the fixation of the elements on the board.

In a particularly advantageous embodiment, the vaporizer comprises a plurality of resistance heating elements connected in parallel, wherein each heating element is associated with its own measuring circuit and the electronic control device is set up to determine the resistance and to control the temperature of each heating element individually. This allows the heater temperature to be measured with a certain spatial resolution in a corresponding number of heating areas, whereas in the prior art it is usually only possible to determine the average temperature of the entire vaporizer. In contrast, the invention can control the amount of steam by the number of heating elements. If, for example, one heating element deviates from the target state, the vaporizer can still be operated with the remaining heating elements.

Particularly in the case of plug-in systems with an interface between a consumption unit with vaporizer unit and base part with electronic control unit, a reduction in the number of contacts or lines can be advantageous. For this purpose, the inhaler advantageously comprises a multiplexer/demultiplexer system arranged between the electronic control device and the measuring circuit(s).

BRIEF DESCRIPTION OF THE FIGURES

The invention is explained below by means of preferred embodiments with reference to the accompanying figures. Thereby shows FIG. 1 a schematic diagram of an electronic cigarette product.

DETAILED DESCRIPTION

Figure 1:
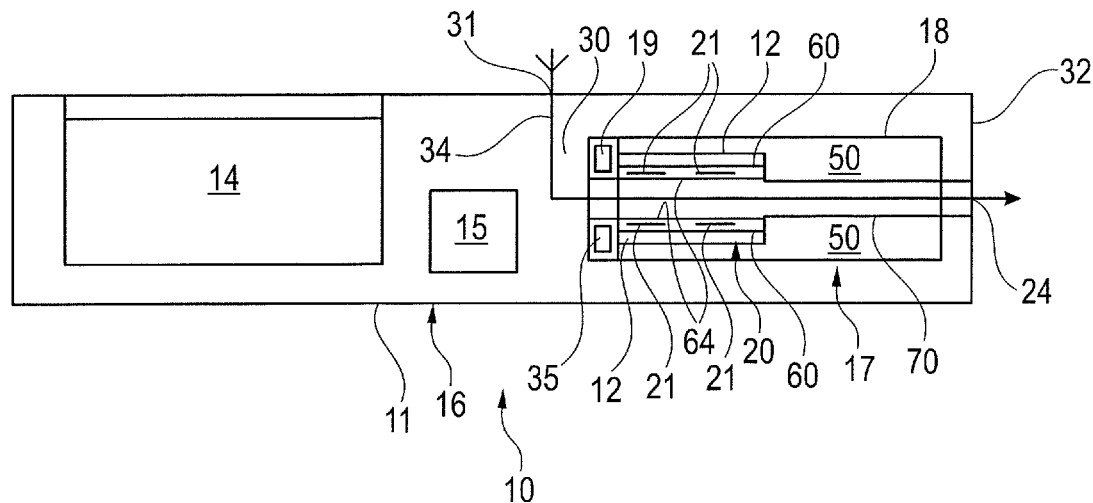

The inhaler 10, in this case an electronic cigarette product, comprises a housing 11 in which an air channel 30 is provided between at least an air inlet port 31 and an air outlet port 24 at a mouth end 32 of the cigarette product 10. The mouth end 32 of the cigarette product 10 thereby designates the end at which the consumer draws for the purpose of inhalation, thereby applying a negative pressure to the cigarette product 10 and generating an air flow 34 in the air channel 30.

The cigarette product 10 advantageously comprises a base part 16 and a consumption unit 17, which comprises a vaporizer unit 20 and a liquid reservoir 18 and is in particular in the form of a replaceable cartridge. The air drawn in through the inlet port 31 is directed in the air channel 30 to, or through, the at least one vaporizer unit 20. The vaporizer unit 20 is connected or connectable to the liquid storage tank 18, in which at least one liquid 50 is stored. The vaporizer unit 20 evaporates liquid 50 supplied to it from the liquid storage 18, and supplies the evaporated liquid as an aerosol/vapor into the air stream 34 at an outlet side 64. An advantageous volume of the liquid reservoir 18 is in the range between 0.1 ml and 5 ml, preferably between 0.5 ml and 3 ml, further preferably between 0.7 ml and 2 ml or 1.5 ml.

The electronic cigarette 10 further comprises an electrical energy storage device 14 and an electronic control device 15. The energy storage device 14 is generally arranged in the base part 16 and may in particular be a disposable electrochemical battery or a rechargeable electrochemical accumulator, for example a lithium-ion accumulator. In the example shown in FIG. 1, the energy storage device 14 is arranged in a part of the inhaler 10 facing away from the mouth end 32. The consumption unit 17 is arranged between the energy storage device 14 and the mouth end 32. The electronic control device 15 comprises at least one digital data processing device, in particular microprocessor and/or microcontroller, in the base part 16 (as shown in FIG. 1) and/or in the consumption unit 17.

A sensor, for example a pressure sensor or a pressure or flow switch, is advantageously arranged in the housing 11, wherein the control device 15 can determine, based on a sensor signal output by the sensor, that a consumer is drawing on the mouth end 32 of the cigarette product 10 to inhale. In this case, the control device 15 controls the vaporizer unit 20 to add liquid 50 from the liquid storage 18 as an aerosol/vapor into the air stream 34.

The liquid 50 stored in the liquid reservoir 18 to be metered is, for example, a mixture of 1,2-propylene glycol, glycerol, water, at least one aroma (flavor) and/or at least one active ingredient, in particular nicotine.

Figure 2:
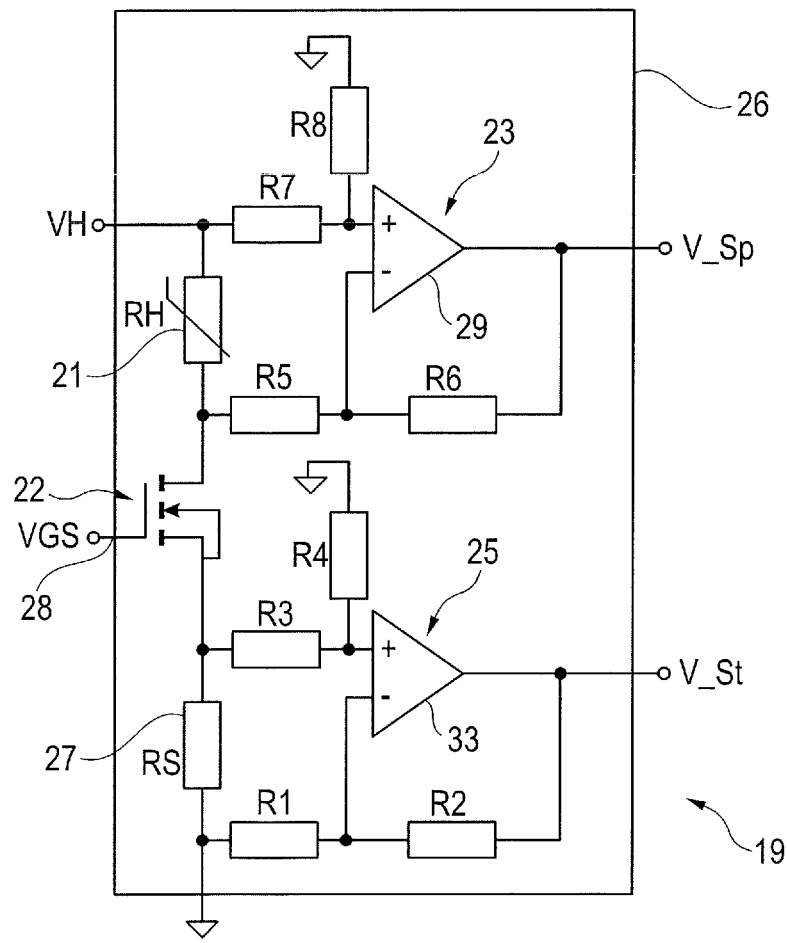
FIG. 2 a circuit diagram for a measuring circuit associated with a heating element.

The vaporizer unit 20 comprises at least one vaporizer 60 with at least one resistive heating element 21 (see FIG. 2) and a liquid supply 12 for supplying liquid 50 from the liquid reservoir 18 to the vaporizer 60. Due to the ohmic resistance, a current flow through the electrically conductive heating element 21 leads to a heating thereof and therefore to a vaporization of liquid in contact with the heating element 21. The heating element 21 thus acts as a vaporizer 60. Vapor/aerosol generated in this way escapes from the vaporizer 60 to the outlet side 64 and is mixed with the air flow 34, see FIG. 1. The evaporation temperature preferably lies in the range between 100° C. and 400° C., more preferably between 150° C. and 350° C., still more preferably between 190° C. and 290° C.

The vaporizer unit 20 or the at least one vaporizer 60 is arranged in a part of the consumption unit 17 facing away from the mouth end 32. This enables effective electrical coupling and control of the vaporizer unit 20. The air flow 34 advantageously leads to the air outlet port 24 through an air channel 70 running axially through the liquid storage tank 18.

The consumption unit or cartridge 17 or the base part 16 advantageously comprises a non-volatile data memory 35 for storing information or parameters relating to the consumption unit or cartridge 17. The data memory can be part of the electronic control device 15. The data memory advantageously stores information on the composition of the liquid stored in the liquid storage tank 18, information on the process profile, in particular power/temperature control; data on condition monitoring or system testing, for example leak testing; data relating to copy protection and counterfeit protection, an ID for unambiguous identification of the consumption unit or cartridge 17, serial number, date of manufacture and/or expiration date, and/or number of draws (number of inhalation draws by the consumer) or the time of use. The data memory is advantageously electrically connected or connectable to the control device 15.

A measuring circuit 19 is advantageously assigned to each heating element 21. This is explained below with reference to FIG. 2. The measuring circuit 19 serves to measure the voltage applied to the heating element and the current flowing through the heating element 21.

The heating voltage VH is applied to the heating element 21 (heating resistor RH). The heating voltage VH can in particular be the battery voltage, i.e. the voltage of the energy storage device 14, or a voltage derived or transformed therefrom. A switching element 22 is connected in the current path of the heating element 21, which can switch the current through the heating element 21 on and off or set it as desired by applying a control voltage V_GS to a control terminal 28. The switching element 22 is advantageously a transistor and further advantageously a MOSFET; in this case the control terminal 28 is the gate terminal and the control voltage V_GS is the gate voltage.

The voltage dropping across the heating element 21 is measured by means of a voltage measuring device 23, which advantageously operates on the basis of a differential or operational amplifier 29. The inputs of the differential or operational amplifier 29 are advantageously connected to the connections of the heating element 21, possibly via resistors R5 or R7. The output voltage V_Sp of the differential or operational amplifier 29 corresponds to the voltage dropping across the heating element 21 or has a clear, known relationship to it.

The current flowing through the heating element 21 is measured by means of a current measuring device 25, which advantageously operates on the basis of a differential or operational amplifier 33. The inputs of the differential or operational amplifier 33 are preferably connected to the terminals of a reference resistor 27 connected in series with the heating element 21, possibly via resistors R1 or R3. The reference resistor comprises a fixed and defined resistance value and is connected in the current path of the heating element 21. The switching element 22 is advantageously connected between the heating element 21 and the reference resistor 27. The output voltage V_St of the differential or operation amplifier 33 is proportional to the current flowing through the heating element 21 or has a clear known relationship to it.

The measured values V_Sp and V_St are transmitted to the electronic control device 15, which uses them to calculate the resistance of the heating element 21, in particular by means of Ohm's law, and switches the switching element 22 on and off on the basis of the determined resistance, thus controlling the current flow through the heating element 21 in the sense of a desired ideal evaporation temperature (target temperature of the heating element 21). This will be explained in the following. It is assumed that the heating element 21 is a PTC resistor, i.e. a resistor made of a material with a positive temperature coefficient. In principle, however, an NTC resistor is also possible, in which case what is said below applies accordingly.

In one embodiment of the invention, an upper critical resistance R_co is stored in the data memory. When the averaged resistance RH of the heating element 21 reaches or exceeds the upper critical resistance R_co, the current flow through the heating element 21 is switched off for a predetermined period of time Δt. For this purpose, the control device 15 sets the control voltage V_GS to zero, for example, so that the switching element 22 is switched off. After the time period Δt has elapsed, the switching element 22 and thereby the current flow through the heating element 21 is switched on again by applying a non-zero control voltage V_GS until the determined resistance RH of the heating element 21 reaches the upper critical resistance R_co and the heating current is switched off again.

In an advantageous embodiment of the invention, a lower critical resistance R_cu is additionally stored in the data memory. When the determined resistance RH of the heating element 21 reaches or exceeds the upper critical resistance R_co, the current flow through the heating element 21 is switched off for a predetermined time interval Δti, for example for about 2 ms, and then switched on for a short measuring interval Δtm, wherein Δtm<<Δti, i.e. Δtm is smaller than Δti by at least a factor of 10 and is, for example, shorter than or equal to 100 μs.

Within the measurement interval Δtm the resistance of the heating element 21 is determined as described before. If and as long as the measured resistance RH of the heating element 21 is above the lower critical resistance R_cu, the current flow through the heating element 21 is switched off again for a predetermined time interval Δti and then the measurement is repeated periodically. Only when the measured resistance RH of the heating element 21 reaches or falls below the lower critical resistance R_cu, the current flow through the heating element 21 is switched on again and remains switched on as long as the measured resistance of the heating element 21 is below the upper critical resistance.

Preferably, the vaporizer unit 20 or the vaporizer 60 comprises a plurality of heating elements 21 connected in parallel, see FIG. 1, wherein advantageously a separate measuring circuit 19 is assigned to each heating element 21. All heating elements 21 are advantageously operated from the same voltage source 14 with the same heating voltage VH. The heating voltage VH may be a substantially constant supply voltage and correspond, for example, to the battery voltage, i.e. the voltage of the power source 14, or to a voltage transformed therefrom.

As previously described, the control or regulation of the heating element(s) 21 is not performed by changing the heating voltage VH, but exclusively by switching the switching element 22 off or on and thus the current flow through the heating element(s) 21.

Instead of the previously described switch-off control, i.e. control of the heater temperature by switching off the switching element 22 and thus the current flow through the heating element 21, control can alternatively be effected by means of pulse width modulation.

Figure 3:
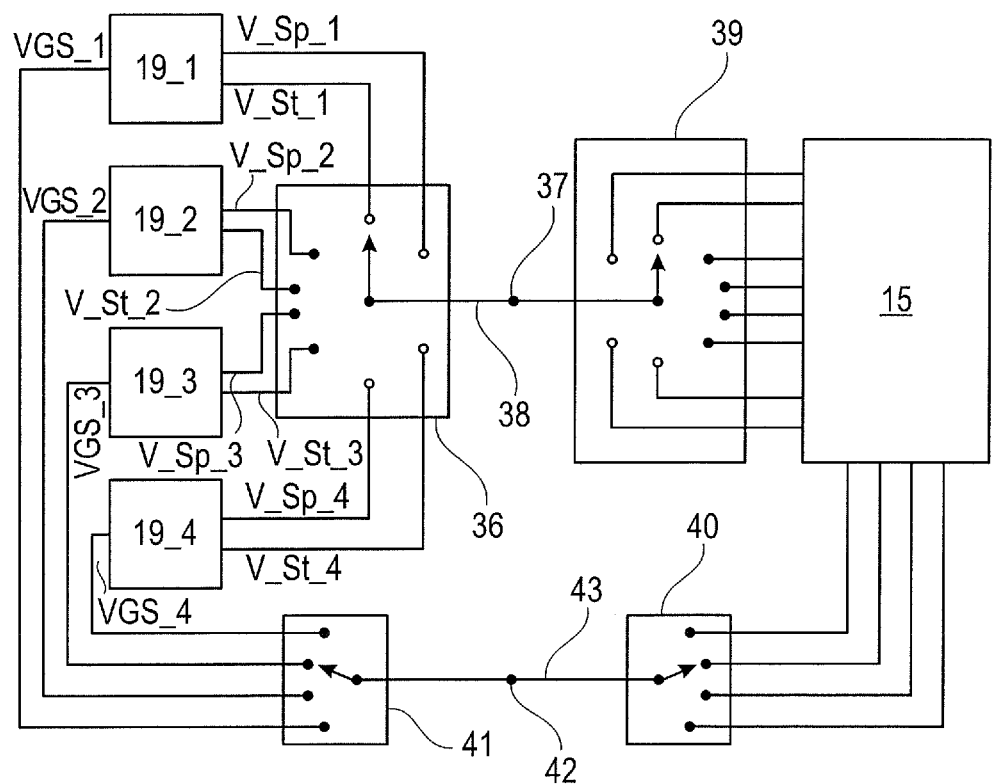
FIG. 3 a schematic diagram illustrating a multiplexer/demultiplexer system for an inhaler.

An exemplary embodiment with four heating elements 21 and four corresponding measuring circuits 19_1 . . . 4 is described below with reference to FIG. 3. A maximum power of Pmax=20 W and a battery voltage of Vbat=3.7 V are provided only as examples. The target power and the battery voltage result in a total resistance of the four parallel heating wires 21 of RHges=0.68Ω or a resistance per heating wire 21 of RH=2.7Ω. With a design of the reference resistor 27 of RS=0.05Ω, only about 1.8% of the battery power is lost for current measurement. In addition, only the temperature-dependent resistance RH in the range of approx. 2.7Ω has to be measured and not the temperature-dependent total resistance in the range of 0.68Ω, so that a fourfold higher relative accuracy and thus a fourfold better temperature resolution can be achieved with the same absolute accuracy.

A local hot spot could also be detected much earlier, since the temperature would not be averaged over the entire heater area, but only over a quarter of the area.

In a system with four heaters 21, the control device 15 or the microcontroller has to process eight analog signals, namely four measured heater voltages V_Sp_1 . . . 4 and four measured heater currents V_St_1 . . . 4, and control four switching elements 22_1, 22_2, 22_3, 22_4, so that with the two connections for the battery voltage a total of fourteen connections would be required without further measures.

Particularly in the case of plug-in systems with an interface between consumption unit 17 (with vaporizer unit 20) and base part 16 (with control device 15), a reduction in the number of contacts can be advantageous. To achieve this, a multiplexer 36 in the consumption unit 17 can route the aforementioned (for example, eight) analog signals via a contact 37 or a signal line 38 to a demultiplexer 39 in the base part 16 and from there on to the control unit 15. Similarly, a multiplexer 40 in the base part 16 can forward the (for example four) control signals (gate signals) VGS1 . . . 4 via a contact 42 or a signal line 43 to a demultiplexer 41 and from there to the (for example four) controllable switching elements 22.

A system with the minimum number of contacts would thus consist of the two battery contacts, one analog measuring contact and two control lines, so that in total only five contacts are required.

The multiplexer 40 can be controlled by means of the two control lines in such a way that the battery voltage is switched through to the different channels. The measured heating current V_St_1 . . . 4 is also switched to the measuring line in each case in order to be scaled in the base part 16 with a measuring amplifier, for example a differential or operational amplifier 29, 33. Subsequently, the scaled or amplified measured heating current V_St_1 . . . 4 can be interpreted in the control device 15.

Additionally, an ID can also be read out via the control line by setting up a data bus, for example an I2C bus.

Multiplexer 36 and demultiplexer 41 can be implemented in one unit or as a uniform multiplexer/demultiplexer 36, 41. Similarly, multiplexer 40 and demultiplexer 39 may be implemented in one structural unit or as a unitary multiplexer/demultiplexer 39, 40.

Other multiplexer/demultiplexer arrangements are possible. For example, the (here four) measured voltages V_Sp1 . . . 4 and the (here four) measured currents V_St1 . . . 4 can each be transmitted to the control device 15 via a separate line. In a further embodiment, the (here four) measured voltages V_Sp1 . . . 4, the (here four) measured currents V_St1 . . . 4 and the (here four) control signals can be transmitted via a single line, which reduces the number of contacts by one again. Other arrangements are possible. Crucial is that by means of multiplexers/demultiplexers the number of contacts between base part and consumer part can be reduced considerably.

Advantageously, the measuring circuit 19 is designed so that only a very small proportion of the battery voltage drops across the switching element 22 and the reference resistor 27. This can be achieved in particular by selecting the resistance value of the reference resistor 27 to be small (at least a factor of 10 smaller) in relation to the resistances of the heating element 21 or the total resistance of the heating elements 21. In this case it is sufficient to measure the heater voltage VH with the voltage measuring device 23. The measurement of the voltage drop across each individual heater 21 (differential amplifier 23 in FIG. 2) can then be advantageously omitted and the control device 15 only has to process five analog signals with four channels.

Figure 4:
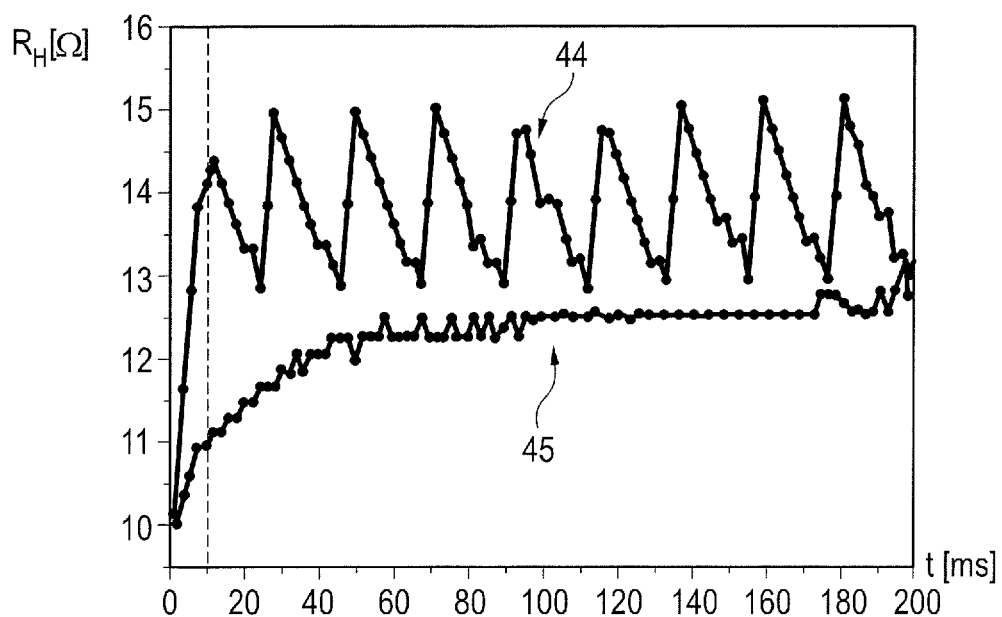
FIG. 4-6 resistance-time diagrams explaining the vaporization behavior of various liquids and various vaporization parameters.

With the structure described above, the resistance of the heaters 21 and thus their average temperature can be determined in a time-resolved manner, i.e. RH(t) or R(t) for short is determined. This makes it possible to control the evaporation process and is explained below by way of example using FIGS. 4 to 6. Shown therein are diagrams in which the resistance RH(t) of the heating element (V_Sp/V_St) determined by the control device 15 is plotted against time. Advantageously, the control device also determines the time derivative of the function R(t), i.e. dR(t)/dt or equivalently dT(t)/dt.

For a better understanding, the dynamics of the evaporation process shall be described qualitatively. The generated thermal power is $UH^2/R(t)$. Part of this power heats the heating wire 21, another part heats the surrounding liquid 50 via heat conduction and finally the third part is lost via heat conduction at the ends of the heating wire 21 into the substrate 26. If the heater 21 is suitably designed, in particular in the form of a relatively long wire with a small cross-section, this third part is comparatively small and will be neglected in the following description.

At the beginning of the evaporation process, the heater 21 is heated up starting from ambient temperature. When the heater 21 is dry or partially dry, the heat cannot be transferred to the liquid, and the heat transfer to the ambient air is significantly less than that to the liquid. Accordingly, when the heater 21 is dry or partially dry, a larger portion of the heating power goes into heating the wire 21. Accordingly, the heating rate dR(t)/dt or dT(t)/dt is increased compared to the ideal configuration.

Thus, the evaluation of the initial heating rate dR(t)/dt or dT(t)/dt can be used to check the wetting of the heater 21. This is exemplified in FIG. 4, wherein curve 44 was measured on a dry heater 21 without liquid re-feeding and curve 45 was measured on a wetted heater 21 with liquid re-feeding. The resistance of the dry heater 21 (curve 44) changes within the first 10 ms from 10Ω to 14Ω, i.e. by 40%, while the resistance of the wetted heater 21 (curve 45) increases only from 10Ω to 11Ω, i.e. by 10%. Accordingly, the dry heater 21 initially has a heating rate about four times higher.

When the temperature of the liquid surrounding heater 21 reaches the evaporation temperature, the relative amount of heat transfer into the liquid increases abruptly. This jump is expressed in a sudden reduction of the heating rate dT(t)/dt. If the heating power is not too high, the heating rate drops to zero, resulting in a time-constant resistance (time-constant temperature). Thus, the resistance $R(T_{evaporation})$ corresponding to the evaporation temperature can be determined without further knowledge of the liquid or the heater characteristics. Possible manufacturing tolerances of the heater 21 or measuring errors due to too high contact resistances of the heater 21 can be corrected in this way. This effect can also be seen in FIG. 4, namely in the plateau of curve 45 in the range between 95 ms and 170 ms. The evaporation resistance for the wetted heater is here, for example, $R(T_{evaporation})$=12.5Ω.

In the course of draining the liquid reservoir 18 by evaporation of the liquid 50, there is a risk of enrichment of higher boiling components of the liquid in the remaining liquid. The determination of the evaporation resistance $R(T_{evaporation})$ described above can measure this process, since the evaporation temperature increases in the course of the emptying of the liquid reservoir 18. The knowledge thus gained about the changed composition of the liquid can be used to adjust the evaporation parameters (in particular the threshold values R_co or R_cu of the heater resistance) or, if a preset value for the evaporation temperature is exceeded, to evaluate the cartridge as empty and prevent further evaporation.

Figure 5:
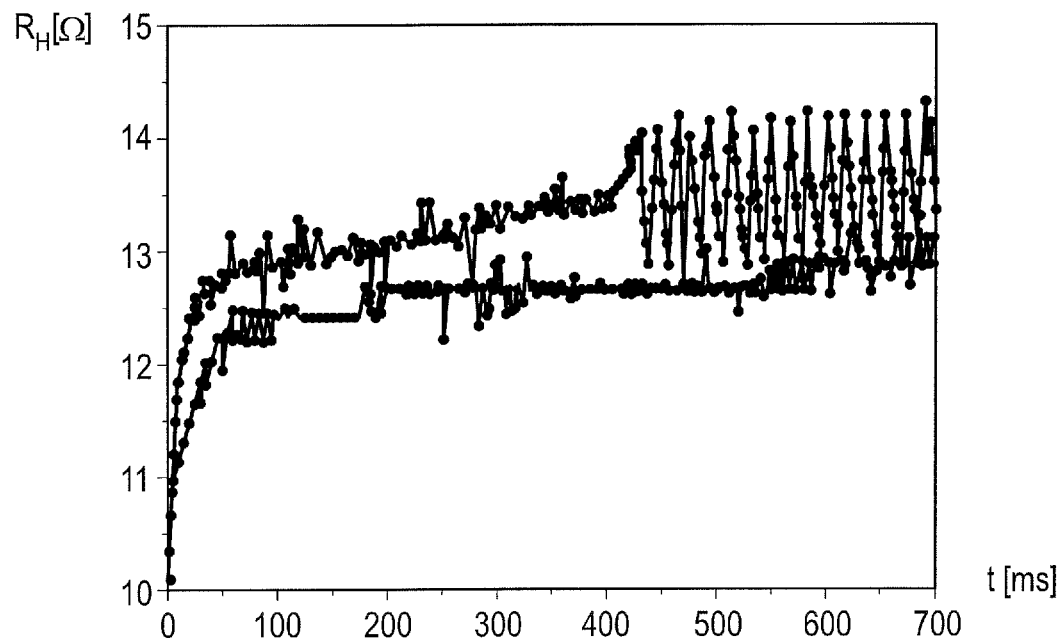

FIG. 5 shows an example of the heating curves of two different liquids. The upper curve corresponds to a first liquid and parameters R_co=14Ω, R_cu=13Ω, VH=9 V. The lower curve corresponds to a second liquid and parameters R_co=14Ω, R_cu=13Ω, VH=8 V. The kink in the heating curve is located at different resistances, namely at about 12.4Ω for the lower curve and about 12.7Ω for the upper curve.

In case of insufficient liquid feeding, e.g. due to clogged pores of capillary material, increased viscosity of the liquid due to low ambient temperature or an increased proportion of highly viscous components (glycerol) or too high heater power, large vapor bubbles may form below the heater 21. This leads to less contact between heater 21 and liquid, so that heating between the lower threshold value R_cu and the upper threshold value R_co is faster than in the ideal case. Checking the heating time between the threshold values thus provides information about the presence of large vapor bubbles covering significant portions of the heater surface. This knowledge can lead to a reduction of the heating power by adjusting the heater parameters (especially threshold values R_cu or R_co), to a shutdown of the affected heater 21 or heater channel in case of several heaters 21, and/or to an error message.

Such an effect is visible in FIG. 5. The upper curve shows a steep rise after approx. 400 ms, which indicates a local gas bubble or a local drying out. After that, the control starts. In this case, the heater 21 does not fully wet again, which can be seen from the subsequent steep heating phases. In this case, the aforementioned countermeasures are indicated.

Figure 6:
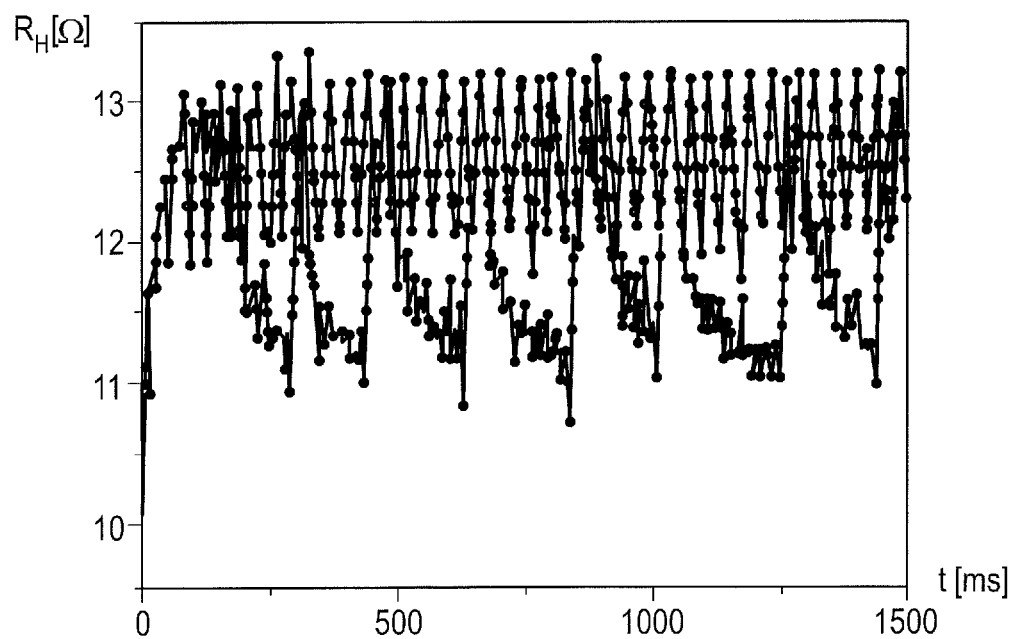

While the value for the upper resistance threshold R_co is determined by the decomposition temperature of the liquid or by the maximum re-feeding rate of the heater 21, the lower threshold R_cu can be set freely over a wide range. FIG. 6 shows an example of this. The upper curve corresponds to parameters R_co=13Ω, R_cu=12Ω. The lower curve corresponds to parameters R_co=13Ω, R_cu=11Ω. In the case of the lower curve with the lower threshold R_cu, a smaller proportion of the drawing or puffing duration is in the temperature range of effective evaporation. This results in a lower averaged vapor quantity overall. Accordingly, the lower threshold R_cu can be used to adjust the steam quantity.

Embodiments

Embodiment 1. Method for temperature control of a vaporizer (60) for an inhaler, in particular an electronic cigarette product, wherein the vaporizer (60) comprises at least one electric resistance heating element (21), and with an electronically controlled switching element (22), wherein the current flow through the heating element (21) can be switched on and off with the switching element (22), characterized by the steps of measuring the voltage applied to the heating element (21);
measuring the current flowing through the heating element (21);
determining the resistance of the heating element (21) from the measured voltage and the measured current;
controlling the temperature of the heating element (21) by controlled switching off of the switching element (22) so that the current flow through the heating element (21) is interrupted when the determined resistance exceeds or falls below a first critical threshold R_co.

Embodiment 2. Method according to embodiment 1, characterized in that the current flow through the heating element (21) is switched off for a predetermined period of time when the determined resistance exceeds or falls below the first critical threshold R_co.

Embodiment 3. Method according to embodiment 1, characterized in that the current flow through the heating element (21) remains substantially switched off until the determined resistance falls below or exceeds a second critical threshold R_cu.

Embodiment 4. Method according to embodiment 3, wherein the current flow through the heating element (21) is periodically switched on only for a short measurement interval in order to be able to perform the resistance measurement.

Embodiment 5. Method according to embodiments 3 or 4, characterized in that the first critical threshold R_co is an upper threshold and the second critical threshold R_cu is a lower critical threshold, such that R_cu<R_co.

Embodiment 6. Method according to embodiment 5, characterized in that the lower threshold R_cu is used to adjust the amount of steam to be produced.

Embodiment 7. Method according to one of the embodiments 2 to 6, characterized in that after the predetermined period of time has elapsed, or when the determined resistance again falls below or exceeds the second critical threshold R_cu, the switching element (22) is switched on again, so that current flows through the heating element (21) again.

Embodiment 8. Method according to one of the preceding embodiments, characterized in that the temperature regulation is performed by controlling the switching element (22) for pulse-width-modulated voltage supply of the heating element (21), instead of switching off the switching element (22).

Embodiment 9. Method according to one of the preceding embodiments, characterized in that the resistance R(t) of the at least one heating element (21) is determined in a time-resolved manner.

Embodiment 10. Method according to embodiment 9, characterized in that the time derivative dR(t)/dt of the resistance R(t) of the at least one heating element (21) is determined.

Embodiment 11. Method according to embodiment 10, that the heating rate dR(t)/dt and/or the cooling rate dR(t)/dt at a certain point in time or in a certain period of time is used as a measurement for the wetting of the heating element with liquid.

Embodiment 12. Method according to embodiment 10 or 11, characterized in that, if the heating rate dR(t)/dt is greater than a predetermined value, the presence of a large vapor bubble covering significant portions of the heater surface is concluded.

Embodiment 13. Method according to embodiment 12, characterized in that in the case of detection of a large vapor bubble one or more suitable measures are initiated, in particular reduction of the heating power, adjustment of the heater parameters, shutdown of the affected heater (21) and/or output of an error message.

Embodiment 14. Method according to one of the embodiments 9 to 13, characterized in that, when a time-constant resistance is determined, the resistance $R(T_{evaporation})$ corresponding to the evaporation temperature is determined.

Embodiment 15. Method according to embodiment 14, characterized in that an enrichment of higher-boiling components in the liquid is determined from a change in the resistance $R(T_{evaporation})$ corresponding to an increase of the evaporation temperature.

Embodiment 16. Method according to embodiment 15, characterized in that, when an enrichment of higher-boiling components in the liquid is determined, evaporation parameters are adjusted.

Embodiment 17. Method according to one of embodiments 14 to 16, characterized in that, when a preset value for the evaporation temperature is exceeded, the liquid reservoir (18) is evaluated as empty and further evaporation is inhibited.

Embodiment 18. Device for temperature control of a vaporizer (60) for an inhaler (10), in particular an electronic cigarette product, wherein the vaporizer (60) comprises at least one electric resistance heating element (21), and with a measuring circuit (19) comprising
an electronically controlled switching element (22), wherein the current flow through the resistance heating element (21) is switchable on and off with the switching element (22),
a voltage measuring device (23) for measuring the voltage applied to the heating element (21),
a current measuring device (25) for measuring the current flowing through the heating element (21),
wherein the device further comprises electronic control device (15) arranged to determine the resistance of the heating element (21) from the measured voltage and the measured current, and to control the temperature of the heating element (21) by controlled switching off of the current flow through the heating element (21) by corresponding control of the switching element (22) when the determined resistance exceeds or falls below a first critical threshold R_co.

Embodiment 19. Device according to embodiment 18, characterized in that the heating element (21), the switching element (22), the voltage measuring device (23) and the current measuring device (25) are arranged fixed on the same circuit board (26).

Embodiment 20. Device according to one of embodiments 18 or 19, characterized in that the current measuring device (25) comprises a reference resistor (27) connected in the current path defined by the heating resistor (21) and the switching element (22).

Embodiment 21. Device according to one of the embodiments 18 to 20, characterized in that the switching element (22) is a MOSFET.

Embodiment 22. Device according to one of the embodiments 18 to 21, characterized in that the voltage measuring device (23) and/or the current measuring device (25) each comprise a differential limit/operation amplifier (29, 33).

Embodiment 23. Device according to one of the embodiments 18 to 22, characterized in that the vaporizer (60) comprises a plurality of resistance heating elements (21) connected in parallel, wherein a measuring circuit (19) is assigned to each heating element (21) and the electronic control device (15) is set up for determining the resistance and for individually controlling the temperature of each heating element (21).

Embodiment 24. Device according to embodiment 18 to 23, characterized in that the device comprises a multiplexer (36) and/or demultiplexer (41) arranged between the electronic control device (15) and the measuring circuits (19).

The invention claimed is:

1. A method for temperature control of a vaporizer for an inhaler, the method comprising:
    providing a vaporizer for an inhaler,
    wherein the vaporizer comprises:
    a heating element,
    wherein the heating element is an electric resistance heating element; and
    an electronically controlled switching element,
    wherein a current flow through the heating element can be switched on and off with the switching element;
    measuring a voltage applied to the heating element;
    measuring the current flow through the heating element;
    determining a resistance of the heating element from the measured voltage and the measured current; and
    controlling a temperature of the heating element by controlled switching off of the switching element so that the current flow through the heating element is interrupted when the determined resistance:
    exceeds a first critical threshold R_co; or
    falls below the first critical threshold R_co,
    wherein the resistance of the heating element is determined in a time-resolved manner R(t),
    wherein a time derivative dR(t)/dt of the resistance of the heating element is determined, and
    wherein, if the heating rate dR(t)/dt of the resistance of the heating element is greater than a predetermined value, a presence of a large vapor bubble covering significant portions of a heater surface is concluded.

2. The method according to claim 1, wherein the current flow through the heating element is switched off for a predetermined period of time when the determined resistance:
    exceeds the first critical threshold R_co; or
    falls below the first critical threshold R_co.

3. The method according to claim 2, wherein after the predetermined period of time has elapsed, the switching element is switched on again, so that current flows through the heating element again.

4. The method according to claim 1,
    wherein:
    when the switching element is switched off when the determined resistance exceeds the first critical threshold R_co, the current flow through the heating element remains substantially switched off until the determined resistance falls below a second critical threshold R_cu; or when the switching element is switched off when the determined resistance falls below the first critical threshold R_co, the current flow through the heating element remains substantially switched off until the determined resistance exceeds a second critical threshold R_cu.

5. The method according to claim 4, wherein the current flow through the heating element is periodically switched on only for a short measurement interval in order to be able to perform the resistance measurement.

6. The method according to claim 4, wherein:

when the switching element is switched off when the determined resistance exceeds the first critical threshold R_co, the first critical threshold R_co is an upper critical threshold and the second critical threshold R_cu is a lower critical threshold, such that R_cu<R_co; or when the switching element is switched off when the determined resistance falls below the first critical threshold R_co, the first critical threshold R_co is an lower critical threshold and the second critical threshold R_cu is a upper critical threshold, such that R_co<R_cu.

7. The method according to claim 6, wherein:

when the switching element is switched off when the determined resistance exceeds the first critical threshold R_co, the lower critical threshold R_cu is used to adjust the amount of steam to be produced; or when the switching element is switched off when the determined resistance falls below the first critical threshold R_co, the lower critical threshold R_co is used to adjust the amount of steam to be produced.

8. The method according to claim 1, wherein the temperature regulation is performed by controlling the switching element for pulse-width-modulated voltage supply of the heating element, instead of switching off the switching element.

9. The method according to claim 1, wherein a heating rate dR(t)/dt of the resistance of the heating element and/or a cooling rate dR(t)/dt of the resistance of the heating element at a certain point in time or in a certain period of time is used as a measurement for a wetting of the heating element with liquid.

10. The method according to claim 1, wherein in the case of detection of a large vapor bubble one or more suitable measures are initiated, wherein the one or more suitable measures are selected from; reduction of the heating power, adjustment of the heater parameters, shutdown of the affected heater, and output of an error message.

11. The method according to claim 1, wherein, when a time-constant resistance of the heating element is determined, the resistance of the heating element $R(T_{evaporation})$ corresponding to an evaporation temperature, $(T_{evaporation})$ is determined.

12. A method for temperature control of a vaporizer for an inhaler, the method comprising:
providing a vaporizer for an inhaler,
wherein the vaporizer comprises:
a heating element,
wherein the heating element is an electric resistance heating element; and
an electronically controlled switching element,
wherein a current flow through the heating element can be switched on and off with the switching element;
measuring a voltage applied to the heating element;
measuring the current flow through the heating element;
determining a resistance of the heating element from the measured voltage and the measured current; and
controlling a temperature of the heating element by controlled switching off of the switching element so that the current flow through the heating element is interrupted when the determined resistance;
exceeds a first critical threshold R_co; or
falls below the first critical threshold R_co,
wherein the resistance of the heating element is determined in a time-resolved manner R(t),
wherein, when a time-constant resistance of the heating element is determined, the resistance of the heating element $R(T_{evaporation})$ corresponding to an evaporation temperature, $(T_{evaporation})$ is determined, and
wherein an enrichment of higher-boiling components in a liquid is determined from a change in the resistance of the heating element $R(T_{evaporation})$ corresponding to an increase of the evaporation temperature.

13. The method according to claim 12, wherein, when an enrichment of higher-boiling components in the liquid is determined, evaporation parameters are adjusted.

14. A method for temperature control of a vaporizer for an inhaler, the method comprising:
providing a vaporizer for an inhaler,
wherein the vaporizer comprises:
a heating element,
wherein the heating element is an electric resistance heating element; and
an electronically controlled switching element,
wherein a current flow through the heating element can be switched on and off with the switching element;
measuring a voltage applied to the heating element;
measuring the current flow through the heating element;
determining a resistance of the heating element from the measured voltage and the measured current; and
controlling a temperature of the heating element by controlled switching off of the switching element so that the current flow through the heating element is interrupted when the determined resistance;
exceeds a first critical threshold R_co; or
falls below the first critical threshold R_co,
wherein the resistance of the heating element is determined in a time-resolved manner R(t),
wherein, when a time-constant resistance of the heating element is determined, the resistance of the heating element $R(T_{evaporation})$ corresponding to an evaporation temperature $(T_{evaporation})$ is determined, and
wherein, when a preset value for the evaporation temperature is exceeded, a liquid reservoir is evaluated as empty and further evaporation is inhibited.

* * * * *